(12) United States Patent
Motokawa et al.

(10) Patent No.: US 10,938,018 B2
(45) Date of Patent: Mar. 2, 2021

(54) CELL MODULE

(71) Applicant: Panasonic Intellectual Property Management Co., Ltd., Osaka (JP)

(72) Inventors: Shinya Motokawa, Osaka (JP); Daisuke Kishii, Osaka (JP); Keisuke Shimizu, Osaka (JP); Akira Takano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 56 days.

(21) Appl. No.: 16/333,717

(22) PCT Filed: Nov. 8, 2017

(86) PCT No.: PCT/JP2017/040172
§ 371 (c)(1),
(2) Date: Mar. 15, 2019

(87) PCT Pub. No.: WO2018/100983
PCT Pub. Date: Jun. 7, 2018

(65) Prior Publication Data
US 2019/0273243 A1      Sep. 5, 2019

(30) Foreign Application Priority Data

Nov. 30, 2016   (JP) ................................. 2016-231959

(51) Int. Cl.
*H01M 10/052*   (2010.01)
*H01M 2/34*     (2006.01)
(Continued)

(52) U.S. Cl.
CPC ............. *H01M 2/345* (2013.01); *H01M 2/10* (2013.01); *H01M 2/12* (2013.01); *H01M 2/1241* (2013.01);
(Continued)

(58) Field of Classification Search
CPC ........... H01M 10/0525; H01M 10/052; H01M 2/345; H01M 2/10; H01M 2/12; H01M 2/1241
See application file for complete search history.

(56) References Cited

U.S. PATENT DOCUMENTS

2012/0263995 A1   10/2012   Naito et al.
2014/0154541 A1   6/2014    Asakura et al.
(Continued)

FOREIGN PATENT DOCUMENTS

JP   2013-047873   3/2013
JP   2014-110138   6/2014
(Continued)

OTHER PUBLICATIONS

International Search Report of PCT application No. PCT/JP2017/040172 dated Dec. 26, 2017.

*Primary Examiner* — Olatunji A Godo
(74) *Attorney, Agent, or Firm* — McDermott Will and Emery LLP

(57) ABSTRACT

A cell module includes a plurality of battery cells each having a safety valve at a first end in a height direction, a first current collector plate including a main body having a through hole that at least partly overlaps the safety valve when viewed along the height direction and a lead extending into the through hole from the main body and being electrically connected to a first terminal of each of the battery cells, an exhaust duct disposed over a surface of the first current collector plate remote from the battery cells, and an insulating film being made of an insulating material and covering an area of the first current collector plate facing the exhaust duct. The safety valve opens when an internal pressure of any of the battery cells reaches or exceeds a predetermined level.

14 Claims, 7 Drawing Sheets

(51) Int. Cl.
  *H01M 2/12* (2006.01)
  *H01M 2/20* (2006.01)
  *H01M 2/10* (2006.01)

(52) U.S. Cl.
  CPC ............ *H01M 2/20* (2013.01); *H01M 2/202* (2013.01); *H01M 2/34* (2013.01); *H01M 2200/20* (2013.01)

(56) References Cited

U.S. PATENT DOCUMENTS

2015/0380700 A1    12/2015  Hasegawa et al.
2016/0049626 A1*   2/2016   Yasui ................. H01M 2/1016
                                                       429/54

FOREIGN PATENT DOCUMENTS

| WO | 2012/073403 | 6/2012 |
| WO | 2014/125806 | 8/2014 |

\* cited by examiner

CELL MODULE

This application is a U.S. national stage application of the PCT International Application No. PCT/JP2017/040172 filed on Nov. 8, 2017, which claims the benefit of foreign priority of Japanese patent application No. 2016-231959 filed on Nov. 30, 2016, the contents all of which are incorporated herein by reference.

TECHNICAL FIELD

The present disclosure relates to a cell module.

BACKGROUND ART

A conventional cell module, as described in PTL 1, includes a plurality of battery cells arranged in a matrix. Positive electrode terminals of the battery cells are electrically connected to a positive-electrode current collector plate made of a conductive flat board, whereas negative electrode terminals of the battery cells are electrically connected via fuses to a negative-electrode current collector plate made of a conductive flat board. Thus, the cell module has the plurality of the parallel-connected battery cells and is designed to separate any battery cell through which a large current greater than or equal to a rated current has flowed from an electric circuit by blowing the fuse of the battery cell with Joule heat. This configuration prevents the battery cell from abnormally generating heat due to the flow of large current through the battery cell.

As described in PTL 2, a cell module has a safety valve on one end face of each battery cell in a height direction. The cell module is configured to let the safety valve break and discharge an emission including a high-temperature gas from any of the battery cells if the battery cell reaches an abnormally high temperature and the pressure inside the battery cell rises. The discharged emission passes through a through hole formed in a place of a current collector plate overlapping the battery cell in the height direction and is guided into an exhaust duct disposed over a surface of the current collector plate remote from the battery cells. This configuration allows the emission to flow through the exhaust duct and be discharged outside from an outlet of the exhaust duct and thereby hinders the emission including the high-temperature gas discharged from the abnormally high-temperature battery cell from having an impact on the other battery cells.

CITATION LIST

Patent Literature

PTL 1: International Patent Publication No. 2012/073403
PTL 2: Unexamined Japanese Patent Publication No. 2013-47873

SUMMARY OF THE INVENTION

Technical Problem

The emission discharged from the battery cell due to a brake in the safety valve described above contains many conductive materials such as copper foil. If these conductive materials extend between a positive electrode of the battery cell and the current collector plate, a path of the conductive materials is formed between the positive electrode of the battery cell and the current collector plate and an electric current flows into the path of the conductive materials. Thus, an electric circuit originally designed in the module is changed into a very different one. In addition, the path of the conductive materials hinders a large current from flowing into a fuse for the abnormally high-temperature battery cell. As a result, the fuse may not be blown. This prevents the separation of the abnormally high-temperature battery cell from the circuit of the parallel-connected battery cells, so that the abnormally high-temperature battery cell may further generate heat because of an electric current flowing inside.

It is an object of the present disclosure to provide a cell module that hinders a conductive material contained in an emission from a battery cell from forming a path between an electrode of the battery cell and a current collector plate and thus enables reliable separation of the battery cell having reached an abnormally high temperature from an electric circuit.

Advantageous Effect of Invention

A cell module according to the present disclosure includes a plurality of battery cells that each includes a battery element and a cell case containing the battery element and having a safety valve at a first end in a height direction, the safety valve being configured to open when an internal pressure inside the cell case reaches or exceeds a predetermined level, and a first current collector plate configured to electrically connect first terminals of the plurality of the battery cells. The first current collector plate includes a main body having a through hole that at least partly overlaps the safety valve when viewed along the height direction, and a lead extending into the through hole from the main body and being electrically connected to the first terminal of each of the battery cells. The cell module further includes an exhaust duct disposed over a surface of the first current collector plate remote from the battery cells, the exhaust duct being configured to guide an emission being discharged from at least one of the plurality of the battery cells and passing through the through hole to an outside of the cell module when the safety valve of the at least one battery cell is opened, and an insulating film being made of an insulating material and covering an area of the first current collector plate facing the exhaust duct.

Advantageous Effect of Invention

In the cell module according to the present disclosure, the area of the first current collector plate facing the exhaust duct is covered with the insulating film. Hence, even if an emission containing a conductive material flows into the exhaust duct such that a path of the conductive material is formed to join an inner surface of the exhaust duct and an electrode of any of the battery cells together, the insulating film prevents the path from reaching the first current collector plate. Accordingly, the emission discharged into the exhaust duct does not establish any electrical connection between the electrode of the battery cell and the first current collector plate. This configuration hinders a conductive material contained in an emission from a battery cell having reached an abnormally high temperature from forming a path to a current collector plate and thus enables reliable separation of the abnormally high-temperature battery cell from an electric circuit.

DESCRIPTION OF EMBODIMENTS

Exemplary embodiments of the present disclosure will now be described in detail with reference to the attached drawings. It is initially envisaged that a new exemplary embodiment can be made by suitably combining some distinctive elements in any of the exemplary embodiments and modifications described hereafter. In the description given hereinafter, cylindrical cells 11 are incorporated in cell module 10 and a side of each cylindrical cell 11 adjacent to a positive electrode (adjacent to exhaust duct 70) in a height direction (in an axis direction) is defined as an upper side.

First Exemplary Embodiment

Figure 1:
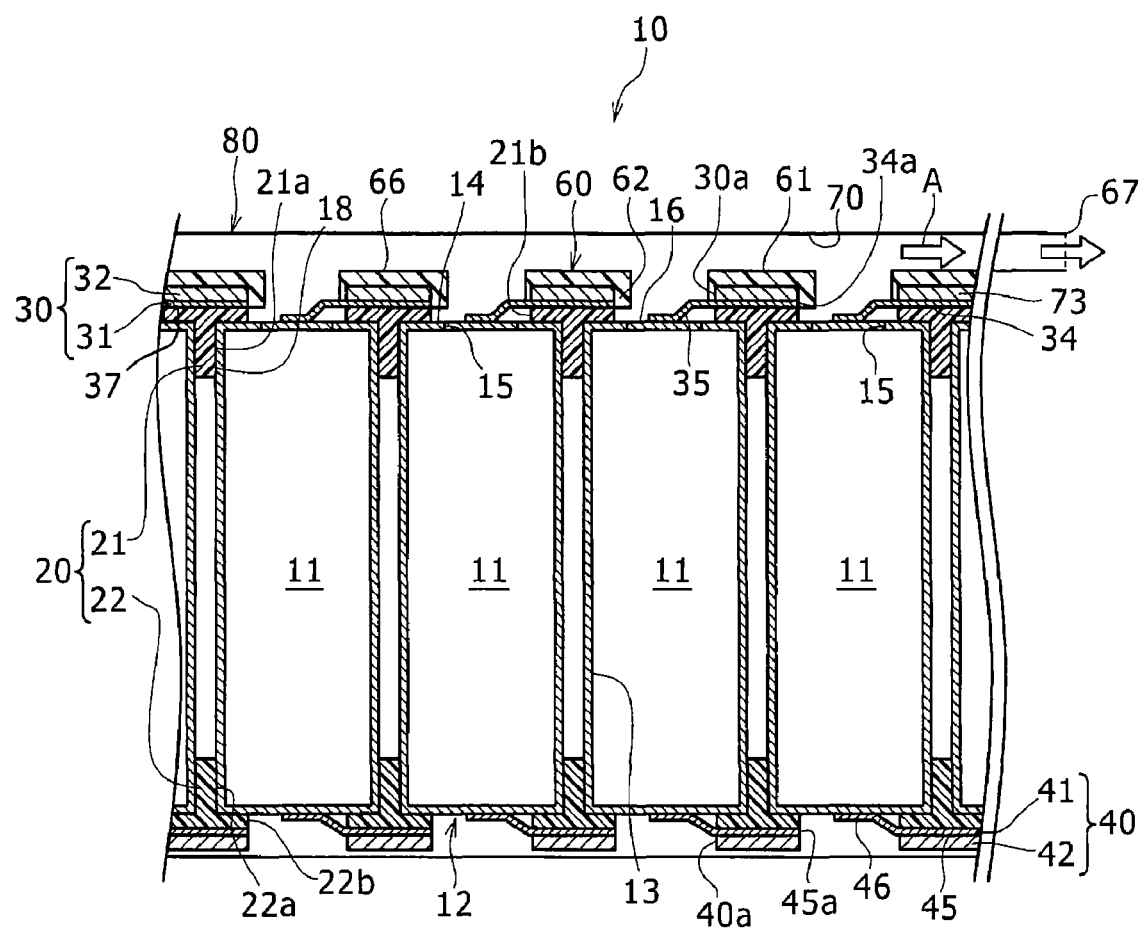
FIG. 1 is a schematic cross-sectional view of a cell module according to a first exemplary embodiment of the present disclosure, viewed along central axes of two or more cylindrical cells out of a plurality of cylindrical cells included in the cell module.

FIG. 1 is a schematic cross-sectional view of cell module 10 according to a first exemplary embodiment of the present disclosure, viewed along central axes of two or more cylindrical cells 11 out of a plurality of cylindrical cells 11 included in cell module 10.

As shown in FIG. 1, cell module 10 includes a plurality of cylindrical cells 11 and cell holder 20 having a plurality of containers 18 to contain cylindrical cells 11. In the example shown in FIG. 1, the plurality of containers 18 is arranged in a matrix when viewed from above, with a left-right direction of the figure representing one direction and a direction perpendicular to the figure representing the other direction. However, the plurality of the containers may be arranged in a staggered manner when viewed from above.

Cylindrical cell 11 is an example of a battery cell and is, for example, formed of a secondary cell such as a lithium ion secondary cell. Cylindrical cell 11 includes cell case 12 made of metal, a battery element (not shown) contained in cell case 12, a positive electrode terminal, and a negative electrode terminal. The battery element includes a pair of electrodes and a non-aqueous electrolyte to permit the transfer of electric charge. Cell case 12 is made up of cell case body 13 that is formed in a bottomed cylindrical shape to contain the battery element and sealing plate 14 sealing an opening of cell case body 13. Sealing plate 14 has safety valve 16. Safety valve 16 includes annular breaking portion 15 that breaks first when an internal pressure of the cell exceeds a predetermined level and a portion surrounded by breaking portion 15. The sealing plate is electrically connected to a positive electrode of the battery element. Sealing plate 14 constitutes the positive electrode terminal to act as a first terminal of cylindrical cell 11. In the present exemplary embodiment, an outer peripheral side surface of cell case body 13 is covered with an insulating resin film and a bottom surface of cell case body 13 constitutes the negative electrode terminal. The outer peripheral side surface of cell case body may not be covered with an insulating resin film, and the cell case body may constitute a negative electrode of the cylindrical cell.

Cell holder 20 is formed from a curable resin, for example. Cell holder 20 has first holder 21 to hold an upper end part of each cylindrical cell 11 and second holder 22 to hold a lower end part of each cylindrical cell 11, with these holders coupled together. Containers 18 are each formed of recess 21a of first holder 21 and recess 22a of second holder 22. The upper end part of cylindrical cell 11 is inserted into recess 21a, and the lower end part of cylindrical cell 11 is inserted into recess 22a. First and second holders 21, 22 have respective cylindrical holes 21b, 22b with circular openings at locations overlapping cylindrical cells 11 when viewed along the height direction. Cell module 10 may have one or more battery blocks that each includes one cell holder 20. Resin-made cell holder 20 may be replaced by a cell holder that is made of metal. In this case, to insulate each cylindrical cell, insulation boards are preferably disposed between the plurality of the cylindrical cells and respective current collector plates described next.

Positive-electrode current collector plate 30 is joined to and disposed on first holder 21 to act as a first current collector plate. Positive-electrode current collector plate 30 includes lead plate 31 made of a metallic material and base plate 32 made of a metallic material. Base plate 32 is joined to a top surface of lead plate 31 by welding or other technique. Positive-electrode current collector plate 30 has cylindrical holes (through holes) 30a being put over cylindrical holes 21b and smoothly connecting with cylindrical holes 21b when viewed along the height direction. Cylindrical hole 30a has a circular opening that is substantially identical to the circular opening of cylindrical hole 21b. Lead plate 31 includes main plate 34 having a plurality of through holes 34a and leads 35. Lead 35 extends from an inner surface of through hole 34a of main plate 34 toward a center of through hole 34a and curves toward cylindrical cell 11. An end of the lead is joined to the positive electrode terminal of cylindrical cell 11. Base plate 32 and main plate 34 of lead 35 constitute main body 73 of positive-electrode current collector plate 30. Positive-electrode current collector plate 30 includes main body 73 having cylindrical holes 30a each put over entire safety valve 16 when viewed along the height direction and leads 35 extending into respective cylindrical holes 30a from main body 73 and being electrically connected to the positive electrode terminals of cylindrical cells 11.

Meanwhile, negative-electrode current collector plate 40 is joined to and disposed beneath cell holder 20. Negative-electrode current collector plate 40 includes lead plate 41 made of a metallic material and base plate 42 made of a metallic material. Base plate 42 is joined to an undersurface of lead plate 41 by welding or other technique. Negative-electrode current collector plate 40 has cylindrical holes 40a being put over cylindrical holes 22b and smoothly connecting with cylindrical holes 22b when viewed along the height direction. Lead plate 41 includes main plate 45 having a plurality of through holes 45a and leads 46. Lead 46 extends from an inner surface of through hole 45a of main plate 45 toward a center of through hole 45a and curves toward cylindrical cell 11. An end of the lead is joined to the negative electrode terminal of cylindrical cell 11. Consequently, the plurality of cylindrical cells 11 is connected in parallel by positive- and negative-electrode current collector plates 30, 40. Cell module 10 is, for example, connected in series with other cell module 10 adjacently disposed via a bus bar through positive- and negative-electrode current collector plates 30 and 40.

Positive-electrode current collector plate 30 has an area to which cell holder 20 is not joined, and insulating film 60 that is formed from an insulating material having an insulating property, such as a resin material, is disposed on the area. Insulating film 60 includes surface covering portion 61 to cover a surface of positive-electrode current collector plate 30 remote from cylindrical cells 11 in the height direction and cylindrical hole covering portion 62 to cover an internal circumference of each cylindrical hole 30a.

Exhaust duct 70 is disposed over the surface of positive-electrode current collector plate 30 remote from cylindrical cells 11 in the height direction. The plurality of cylindrical cells 11 is accommodated in module case 80, and exhaust duct 70 is defined by an upper wall part of an inner wall surface of the module case above insulating film 60 and top surface 66 of insulating film 60 remote from cylindrical cells 11 in the height direction. When safety valve 16 opens, an interior of cylindrical cell 11 communicates with exhaust duct 70 via opened safety valve 16, cylindrical hole 21b of first holder 21, and cylindrical hole 30a of positive-electrode current collector plate 30. The upper wall part for exhaust duct 70 has outlet opening 67 to communicate with an outside. In this case, an emission including a high-temperature gas from the interior of cylindrical cell 11 moves through exhaust duct 70 in a direction indicated with arrow A and flows to the outside from outlet opening 67.

Figure 2:
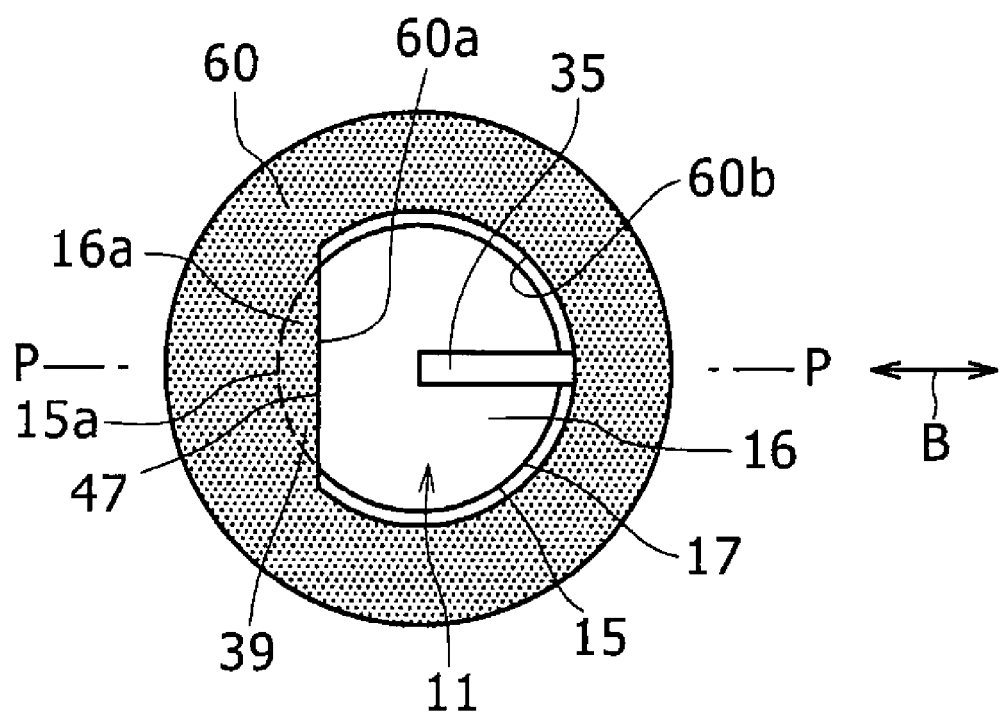
FIG. 2 is a top plan view of a part of the cell module overlapping one of the cylindrical cells, omitting illustration of a case.
Figure 3:
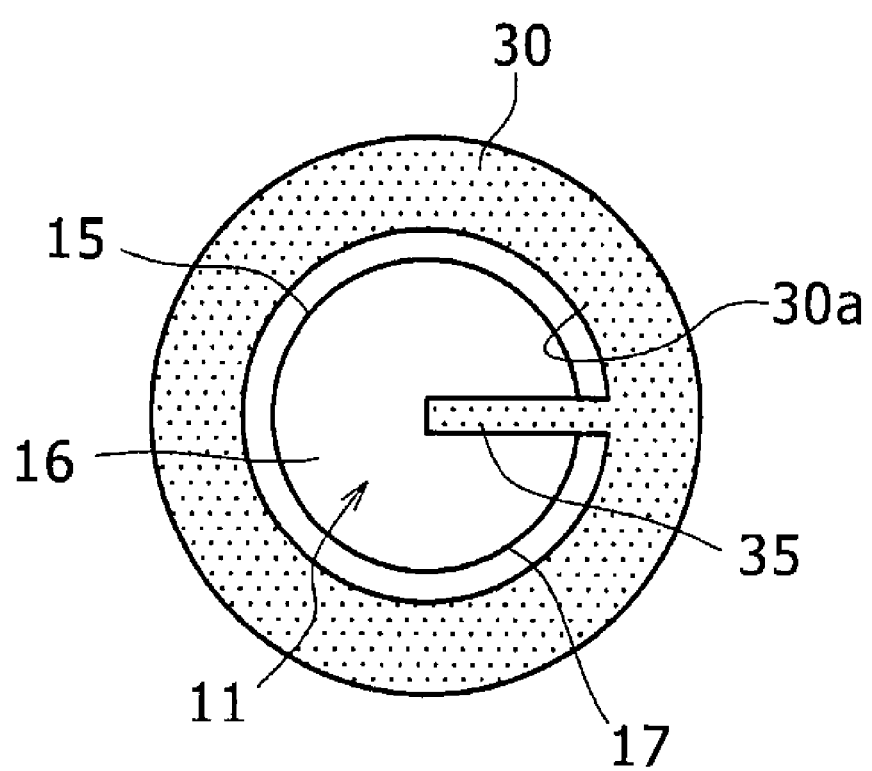
FIG. 3 is a plan view of the part of the cell module in FIG. 2, omitting illustration of an insulating film.

FIG. 2 is a top plan view of a part of the cell module overlapping one cylindrical cell 11, omitting illustration of the case. FIG. 3 is a plan view of the part of the cell module in FIG. 2, omitting illustration of insulating film 60.

As shown in FIGS. 2 and 3, safety valve 16 is disposed on an upper end face (one end face in the axis direction) of cylindrical cell 11 and includes annular breaking portion 15 and a portion surrounded by breaking portion 15. Annular breaking portion 15 is, for example, a groove made in a metallic plate that forms sealing plate 14. The breaking portion breaks first ahead of the other part of cell case 12 in response to a rise in internal pressure following the occurrence of an abnormality in cylindrical cell 11. Groove 17 in breaking portion 15 is generally called a marking that is formed by stamping cell case 12 from outside. A section where breaking portion 15 is formed in sealing plate 14 is a thin-walled part that is thinner in thickness than the other part.

Safety valve 16 has the shape of a perfect circle in plan view. However, the safety valve may have the shape of an ellipse, a polygon, or any other shape in plan view. In the present exemplary embodiment, breaking portion 15 is an annular part having a substantially constant diameter with its center placed at a middle of the upper end face of cylindrical cell 11, such that safety valve 16 is disposed in a central region of the upper end face of cylindrical cell 11. If the internal pressure of cylindrical cell 11 exceeds a predetermined level and breaking portion 15 breaks, safety valve 16 opens outward from cylindrical cell 11 such that an opening is formed in sealing plate 14. This allows an emission including a high-temperature gas to be discharged from the opening.

Insulating film 60 has straight edge 60a substantially perpendicular to plane P that vertically divides the plan view of FIG. 2 into two equal parts. The straight edge 60a is positioned at a distance from a tip of the lead. In the plan view shown in FIG. 2, insulating film 60 is annular, and an inner peripheral edge of the insulating film is made up of straight edge 60a and circular edge 60b that is a part of a circle joined to both ends of straight edge 60a. Insulating film 60 includes flange 39 overlapping a part of safety valve 16 when viewed along the height direction. In insulating film 60, flange 39 includes projection 47 that overlaps a protruding region in the height direction. The protruding region extends inward from the circle containing circular edge 60b.

In safety valve 16, lead opposite region 16a on an opposite side of straight edge 60a from the lead overlaps flange 39 in the height direction. Part 15a of breaking portion 15 overlapping flange 39 when viewed along the height direction is on an opposite side of a center of cylindrical hole 30a (see FIG. 1) of positive-electrode current collector plate 30 from a lead connecting part (a part of lead 35 connected to main plate 34) in a direction (indicated with arrow B) along which lead 35 extends. The part of the breaking portion is positioned at a distance from lead 35. When viewed along the height direction, flange 39 overlapping part 15a of breaking portion 15 does not overlap lead 35.

As shown in FIG. 3, the circular opening of cylindrical hole 30a of positive-electrode current collector plate 30 is disposed concentrically with circular groove 17 forming breaking portion 15 of safety valve 16 and is larger in diameter than circular groove 17. Thus, when viewed along the height direction, entire safety valve 16 is put over cylindrical hole 30a of positive-electrode current collector plate 30.

Figure 4:
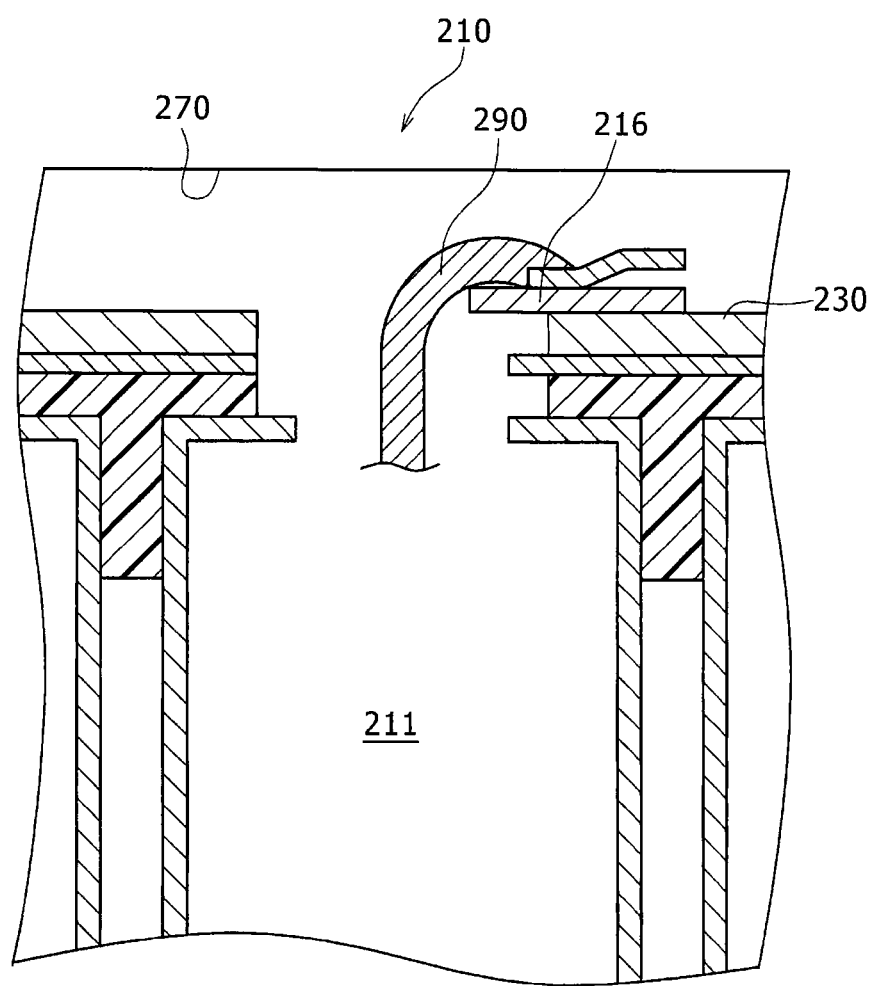
FIG. 4 is a schematic cross-sectional view illustrating a problem with a structure of a cell module in a reference example, viewed along a central axis of a cylindrical cell with a safety valve opened due to abnormal heat generation.
Figure 5:
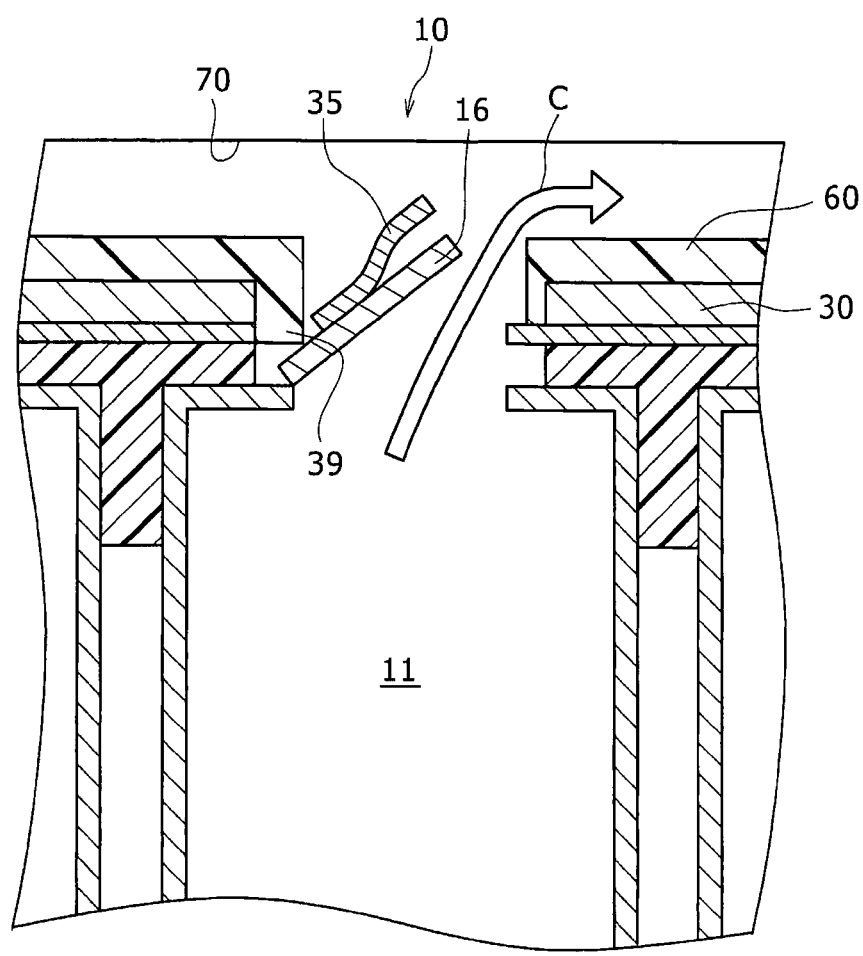
FIG. 5 is a schematic cross-sectional view of a structure corresponding to the structure of FIG. 4 in the cell module according to the first exemplary embodiment.

With reference to FIGS. 4 and 5, operation performed by cell module 10 according to the first exemplary embodiment and effects produced thereby in response to abnormal heat generation in one cylindrical cell 11 will now be described. FIG. 4 is a schematic cross-sectional view illustrating a problem with a structure of cell module 210 in a reference example, viewed along a central axis of cylindrical cell 211 with safety valve 216 opened due to abnormal heat generation. FIG. 5 is a schematic cross-sectional view of a structure corresponding to the structure of FIG. 4 in cell module 10 according to the first exemplary embodiment.

FIG. 4 shows an instance in which no insulating film is put on an outer surface of positive-electrode current collector plate 230. If safety valve 216 is opened following abnormal heat generation in cylindrical cell 211 due to, for example, a minute short circuit between a positive electrode and a negative electrode inside a cell case or other reason, many conductive materials contained in an emission discharged from an interior of the cylindrical cell into exhaust duct 270 may extend from the interior of the cell through a part of the outer surface of positive-electrode current collector plate 230 facing exhaust duct 270 such that path 290 of the conductive materials is formed to join the cell interior and the outer surface part together. Then, an electric circuit originally designed in the module may be changed into a very different one if electric current flows into path 290 of the conductive materials. In addition, a large current may be hindered from flowing into a fuse for abnormally high-temperature cylindrical cell 211, so that the fuse is not be blown and the module cannot separate abnormally high-temperature cylindrical cell 211 from the circuit of the parallel-connected cells. As a result, abnormally high-temperature cylindrical cell 211 may further generate heat because of an electric current flowing inside.

On the other hand, in cell module 10 according to the first exemplary embodiment, an area of positive-electrode current collector plate 30 facing exhaust duct 70 is covered with insulating film 60. Thus, even if safety valve 16 is opened following abnormal heat generation in cylindrical cell 11 and an emission containing conductive materials flows into exhaust duct 70 along a direction indicated with arrow C such that a path of the conductive materials is formed to join an inner surface of exhaust duct 70 and the positive electrode of cylindrical cell 11 together, insulating film 60 prevents the path of the conductive materials from reaching positive-electrode current collector plate 30. Accordingly, even if the emission is discharged into exhaust duct 70, the positive electrode of cylindrical cell 11 is not electrically connected with positive-electrode current collector plate 30 by the conductive materials. Consequently, the emission from abnormally high-temperature cylindrical cell 11 is hindered from forming a high resistance path and the electric circuit originally designed in the module is not changed into a very different one.

Insulating film 60 also covers a portion of an inner circumferential surface of cylindrical hole 30a of positive-electrode current collector plate 30 other than the lead connecting part. Thus, the conductive materials contained in the emission do not form a path between the interior of cylindrical cell 11 and the inner circumferential surface of cylindrical hole 30a of positive-electrode current collector plate 30. This configuration reliably prevents the electric circuit originally designed in the module from being changed into a very different one.

Moreover, when viewed along the height direction, flange 39 does not overlap lead 35, while overlapping part 15a of breaking portion 15 (see FIG. 2). As a result, part 15a of breaking portion 15 overlapping flange 39 is supported by and pressed by flange 39 and is hence difficult to be opened, so that, as shown in FIG. 5, a side of safety valve 16 adjacent to the lead connecting part in the lead extending direction is solely opened. Thus, the cell module opens the side of safety valve 16 adjacent to the lead connecting part and thereby cuts lead 35 and separates cylindrical cell 11 that has abnormally generated heat from the electric circuit. This configuration reliably ensures safety of cell module 10.

In the first exemplary embodiment described above, it is preferable that leads 46 on the negative electrode side each include a fuse to enable the separation of a cylindrical cell that has abnormally generated heat from the electric circuit even if the lead on the positive electrode side is not cut off by the opened safety valve. However, each lead 46 on the negative electrode side may not include any fuse. Leads 35 on the positive electrode side may each include a fuse or may not include any fuse.

In the description given above, the insulating film covers a portion of the inner circumferential surface of cylindrical hole 30a formed in positive-electrode current collector plate 30 other than the lead connecting part. However, the insulating film may not cover the portion of the inner circumferential surface of the through hole formed in the positive-electrode current collector plate other than the lead connecting part.

In the description given above, insulating film 60 does not cover back side 37 of positive-electrode current collector plate 30 adjacent to cylindrical cells 11 (an undersurface of the current collector plate remote from a side facing exhaust duct 70 in the height direction) (see FIG. 1). However, the insulating film may cover the back side of the positive-electrode current collector plate adjacent to the cylindrical cells (the undersurface of the current collector plate remote from a side facing the exhaust duct in the height direction). In particular, if a cell module includes a metallic cell holder instead of resin-made cell holder 20, the cell module preferably includes an insulating board between cylindrical cells 11 and a positive-electrode current collector plate to insulate the cylindrical cells. However, it is preferable that the insulating film also covers the back side of the positive-electrode current collector plate. This configuration prevents the formation of a path connecting the back side of the positive-electrode current collector plate to the interior of any of the cylindrical cells and enables an insulating layer covering the back side to insulate the cylindrical cells. This in turn allows omission of the insulating board.

In the description given above, positive-electrode current collector plate 30 includes cylindrical holes 30a that are each put over entire safety valve 16 when viewed along the height direction. However, a positive-electrode current collector plate may include through holes that each overlap at least a part of a safety valve when viewed along the height direction. In the description given above, insulating film 60 overlaps part 15a of annular breaking portion 15 of safety valve 16 when viewed along the height direction. However, an insulating film may not overlap any part of an annular breaking portion of a safety valve when viewed along the height direction.

In the description given above, the positive electrode terminal acts as the first terminal of the cylindrical cell, and positive-electrode current collector plate 30 acts as the first current collector plate. However, the negative electrode terminal may act as the first terminal of the cylindrical cell and the negative-electrode current collector plate may act as the first current collector plate such that the safety valve is disposed on a bottom surface of the cylindrical cell adjacent to the negative electrode (an undersurface of the cell in the height direction) and the exhaust duct is disposed over a surface of the negative-electrode current collector plate remote from the cylindrical cells. Then, an area of the negative-electrode current collector plate facing the exhaust duct may be covered with an insulating film that is formed from an insulating material such as a resin material. In addition to the area of the negative-electrode current collector plate facing the exhaust duct, the insulating film may cover a portion of an inner circumferential surface of each through hole formed in the negative-electrode current collector plate other than the lead connecting part. The insulating film may also cover a back side of the negative-electrode current collector plate adjacent to the cylindrical cells.

The safety valves may be disposed on the bottom surface of the cylindrical cell adjacent to the negative electrode as well as a top surface of the cylindrical cell adjacent to the positive electrode, respectively, such that the exhaust ducts are disposed over the surface of the negative-electrode current collector plate remote from the cylindrical cells as well as over the surface of the positive-electrode current collector plate remote from the cylindrical cells, respectively. Then, the area of the negative-electrode current collector plate facing the exhaust duct as well as the area of the positive-electrode current collector plate facing the exhaust duct may be each covered with an insulating film that is formed from an insulating material such as a resin material. In this case as well, in addition to the area of the negative-electrode current collector plate facing the exhaust duct, the insulating film may cover a portion of the inner circumferential surface of each through hole formed in the negative-electrode current collector plate other than the lead connecting part. The insulating film may also cover the back side of the negative-electrode current collector plate adjacent to the cylindrical cells.

In the description given above, all the plurality of cylindrical cells 11 contained in cell module 10 is connected in parallel. However, the plurality of the cylindrical cells contained in the cell module may include two or more cylindrical cells that are connected in series. The battery cells described above are cylindrical cells 11. However, the battery cells may be rectangular batteries.

Second Exemplary Embodiment

Figure 6:
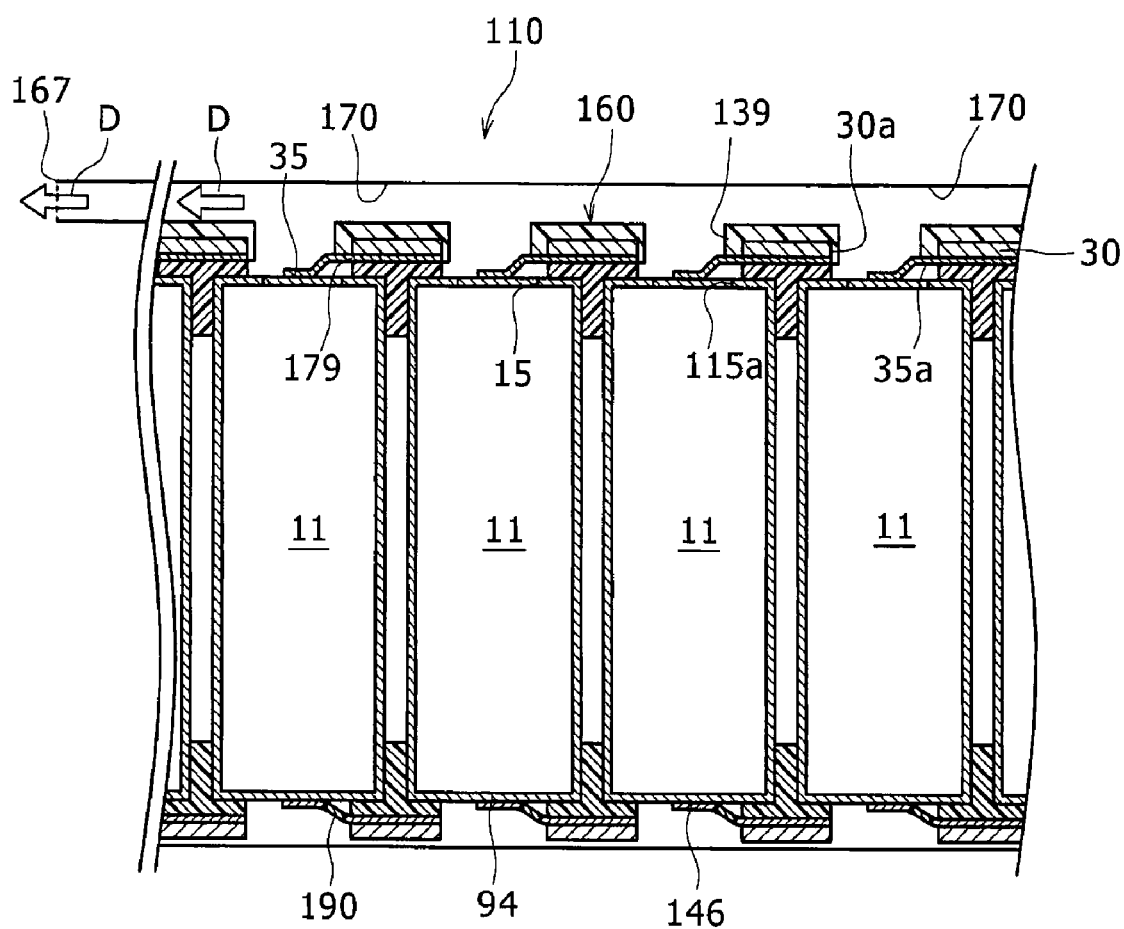
FIG. 6 is a schematic cross-sectional view of a cell module according to a second exemplary embodiment of the present disclosure, viewed in the same way as FIG. 1.
Figure 7:
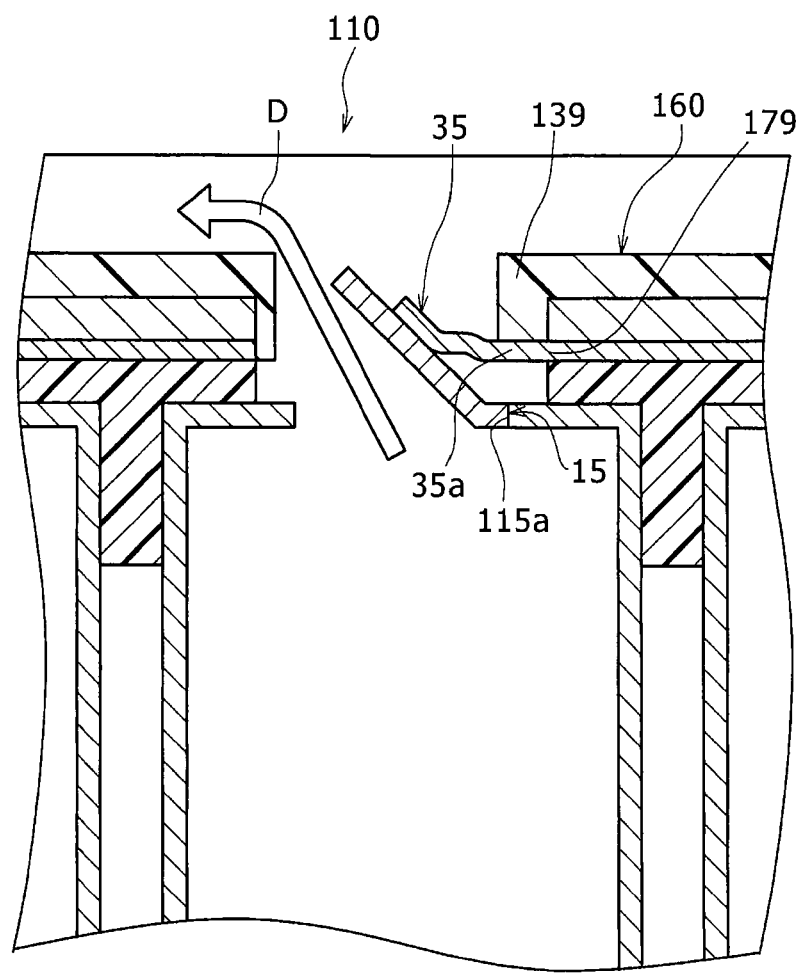
FIG. 7 is a schematic cross-sectional view of a structure corresponding to the structure of FIG. 5 in the cell module according to the second exemplary embodiment.

FIG. 6 is a schematic cross-sectional view of cell module 110 according to a second exemplary embodiment of the present disclosure, viewed in the same way as FIG. 1. FIG. 7 is a schematic cross-sectional view of a structure corresponding to the structure of FIG. 5 in cell module 110 according to the second exemplary embodiment. In the second exemplary embodiment, descriptions of effects and modified examples identical to those in the first exemplary embodiment are omitted, and structural elements identical to those in the first exemplary embodiment are assigned with the same reference numerals and redundant descriptions thereof are omitted.

As shown in FIG. 6, in the second exemplary embodiment, like the first exemplary embodiment, insulating film 160 that covers a top surface of positive-electrode current collector plate 30 adjacent to exhaust duct 170 and an inner circumferential surface of each cylindrical hole 30a of positive-electrode current collector plate 30 includes flange 139 overlapping part 115a of breaking portion 15 when viewed along the height direction. However, unlike the first exemplary embodiment, flange 139 overlaps not only part 115a of breaking portion 15 but also part 35a of lead 35 when viewed along the height direction. When viewed along the height direction, part 115a of breaking portion 15 overlapping insulating film 160 is positioned adjacent to lead connecting part 179 and away from a center of cylindrical hole 30a of positive-electrode current collector plate 30 in a direction in which lead 35 extends.

In the second exemplary embodiment, unlike the first exemplary embodiment, leads 146 on the negative electrode side each include fuse 190. Bottom 94 of cylindrical cell 11 that constitutes a second terminal of the cylindrical cell is electrically connected to lead 146 on the negative electrode side. In the second exemplary embodiment, unlike the first exemplary embodiment, outlet opening 167 of exhaust duct 170 is not disposed on a right side of the figure but is disposed on a left side of the figure. Other structural elements in the second exemplary embodiment are identical to those in the first exemplary embodiment.

As shown in FIG. 7, in the second exemplary embodiment, flange 139 of insulating film 160 overlaps part 115a of breaking portion 15 as well as part 35a of lead 35 when viewed along the height direction. Thus, part 115a of breaking portion 15 overlapping flange 139 is supported by and pressed by flange 139 and is hence difficult to be opened, so that, as shown in FIG. 7, a side of safety valve 16 remote from the lead connecting part in the lead extending direction is solely opened. As a result, even if safety valve 16 opens and an emission flows along a direction indicated with arrow D, the cell module can maintain and protect electrical connection of lead 35 to a positive electrode terminal of cylindrical cell 11. Since insulating film 160 prevents conductive materials contained in the emission from forming a path to the current collector plate, this configuration reliably allows a large current to flow into fuse 190 at the negative electrode side of cylindrical cell 11 that has abnormally generated heat. This enables the cell module to blow fuse 190 and hence reliably separate cylindrical cell 11 that has abnormally generated heat from an electric circuit.

REFERENCE MARKS IN THE DRAWINGS

11: cylindrical cell
12: cell case
15: breaking portion
15a, 115a: part of breaking portion
16: safety valve
30, 130: positive-electrode current collector plate
30a: cylindrical hole
35: lead
35a: part of lead
39, 139: flange
60, 160: insulating film
70, 170: exhaust duct
73: main body
190: fuse.

The invention claimed is:
1. A cell module comprising:
a plurality of battery cells each including:
a battery element, and
a cell case containing the battery element and having a safety valve at a first end in a height direction, the safety valve being configured to open when an internal pressure inside the cell case reaches or exceeds a predetermined level;
a first current collector plate configured to electrically connect first terminals of the plurality of the battery cells, the first current collector plate including:
a main body having a through hole that at least partly overlaps the safety valve when viewed along the height direction, and
a lead extending into the through hole from the main body and being electrically connected to the first terminal of each of the battery cells;
an exhaust duct disposed over a surface of the first current collector plate remote from the battery cells, the exhaust duct being configured to guide an emission being discharged from at least one of the plurality of the battery cells and passing through the through hole to an outside of the cell module when the safety valve of the at least one battery cell is opened; and
an insulating film being made of an insulating material and covering a surface of the first current collector plate facing the exhaust duct.
2. The cell module according to claim 1, wherein the insulating film covers an inner surface of the through hole.
3. The cell module according to claim 1, wherein the insulating film covers a surface of the first current collector plate adjacent to the battery cells.
4. The cell module according to claim 1,
wherein the safety valve includes a breaking portion that is annular and that breaks when the internal pressure inside the cell case reaches or exceeds the predetermined level and a portion surrounded by the breaking portion,
wherein the lead is joined to the safety valve, and
wherein the insulating film includes a flange overlapping a part of the breaking portion when viewed along the height direction, and the flange does not overlap the lead when viewed along the height direction.

5. The cell module according to claim 1,
  wherein the safety valve includes a breaking portion that is annular and that breaks when the internal pressure inside the cell case reaches or exceeds the predetermined level and a portion surrounded by the breaking portion,
  wherein the lead is joined to the safety valve, and
  wherein the insulating film includes a flange overlapping a part of the breaking portion as well as a part of the lead when viewed along the height direction.

6. The cell module according to claim 2, wherein the insulating film covers a surface of the first current collector plate adjacent to the battery cells.

7. The cell module according to claim 2,
  wherein the safety valve includes a breaking portion that is annular and that breaks when the internal pressure inside the cell case reaches or exceeds the predetermined level and a portion surrounded by the breaking portion,
  wherein the lead is joined to the safety valve, and
  wherein the insulating film includes a flange overlapping a part of the breaking portion when viewed along the height direction, and the flange does not overlap the lead when viewed along the height direction.

8. The cell module according to claim 2,
  wherein the safety valve includes a breaking portion that is annular and that breaks when the internal pressure inside the cell case reaches or exceeds the predetermined level and a portion surrounded by the breaking portion,
  wherein the lead is joined to the safety valve, and
  wherein the insulating film includes a flange overlapping a part of the breaking portion as well as a part of the lead when viewed along the height direction.

9. The cell module according to claim 3,
  wherein the safety valve includes a breaking portion that is annular and that breaks when the internal pressure inside the cell case reaches or exceeds the predetermined level and a portion surrounded by the breaking portion,
  wherein the lead is joined to the safety valve, and
  wherein the insulating film includes a flange overlapping a part of the breaking portion when viewed along the height direction, and the flange does not overlap the lead when viewed along the height direction.

10. The cell module according to claim 3,
  wherein the safety valve includes a breaking portion that is annular and that breaks when the internal pressure inside the cell case reaches or exceeds the predetermined level and a portion surrounded by the breaking portion,
  wherein the lead is joined to the safety valve, and
  wherein the insulating film includes a flange overlapping a part of the breaking portion as well as a part of the lead when viewed along the height direction.

11. The cell module according to claim 6,
  wherein the safety valve includes a breaking portion that is annular and that breaks when the internal pressure inside the cell case reaches or exceeds the predetermined level and a portion surrounded by the breaking portion,
  wherein the lead is joined to the safety valve, and
  wherein the insulating film includes a flange overlapping a part of the breaking portion when viewed along the height direction, and the flange does not overlap the lead when viewed along the height direction.

12. The cell module according to claim 6,
  wherein the safety valve includes a breaking portion that is annular and that breaks when the internal pressure inside the cell case reaches or exceeds the predetermined level and a portion surrounded by the breaking portion,
  wherein the lead is joined to the safety valve, and
  wherein the insulating film includes a flange overlapping a part of the breaking portion as well as a part of the lead when viewed along the height direction.

13. The cell module according to claim 1, wherein the insulating film separates the first current collector plate from the exhaust duct.

14. The cell module according to claim 1, wherein the insulating film is disposed between the first current collector plate and the exhaust duct.

* * * * *